United States Patent [19]
Giboult et al.

[11] Patent Number: 5,143,532
[45] Date of Patent: Sep. 1, 1992

[54] METHOD OF FORMING MINERAL FIBERS

[75] Inventors: Alain Giboult, Rantigny; Jean-Yves Aube; Daniel Sainte-Foi, both of Clermont, all of France

[73] Assignee: Isover Saint-Gobain, Courbevoie, France

[21] Appl. No.: 724,779

[22] Filed: Jul. 2, 1991

[30] Foreign Application Priority Data

Jul. 2, 1990 [FR] France ................ 90 08315

[51] Int. Cl.$^5$ .................................. C03B 37/05
[52] U.S. Cl. .................................. 65/6; 65/12
[58] Field of Search ................ 65/6, 12, 15

[56] References Cited
U.S. PATENT DOCUMENTS 3,013,299 12/1961 Owens .................. 65/6
3,159,475 12/1964 Chen et al. ............ 65/15
4,541,854 9/1985 Schonhaar et al. .... 65/15

Primary Examiner—Robert L. Lindsay
Attorney, Agent, or Firm—Oblon, Spivak, McClelland, Maier & Neustadt

[57] ABSTRACT

A method for the formation of mineral fibers in which the material to be fibered is poured in the molten state onto the peripheral surface of the first of a series of centrifuging wheels rotating at high speed in order to be fibered there by centrifugal force. The fibers formed by the various centrifuging wheels are entrained in streams of gas emitted in the immediate vicinity of the said wheels in a direction essentially parallel with the axes of rotation of the wheels. At least one of these streams of gas is emitted at a temperature of between 250° and 900° C. and preferably between 300° and 600° C., and even more preferably around 500° C.

11 Claims, 1 Drawing Sheet

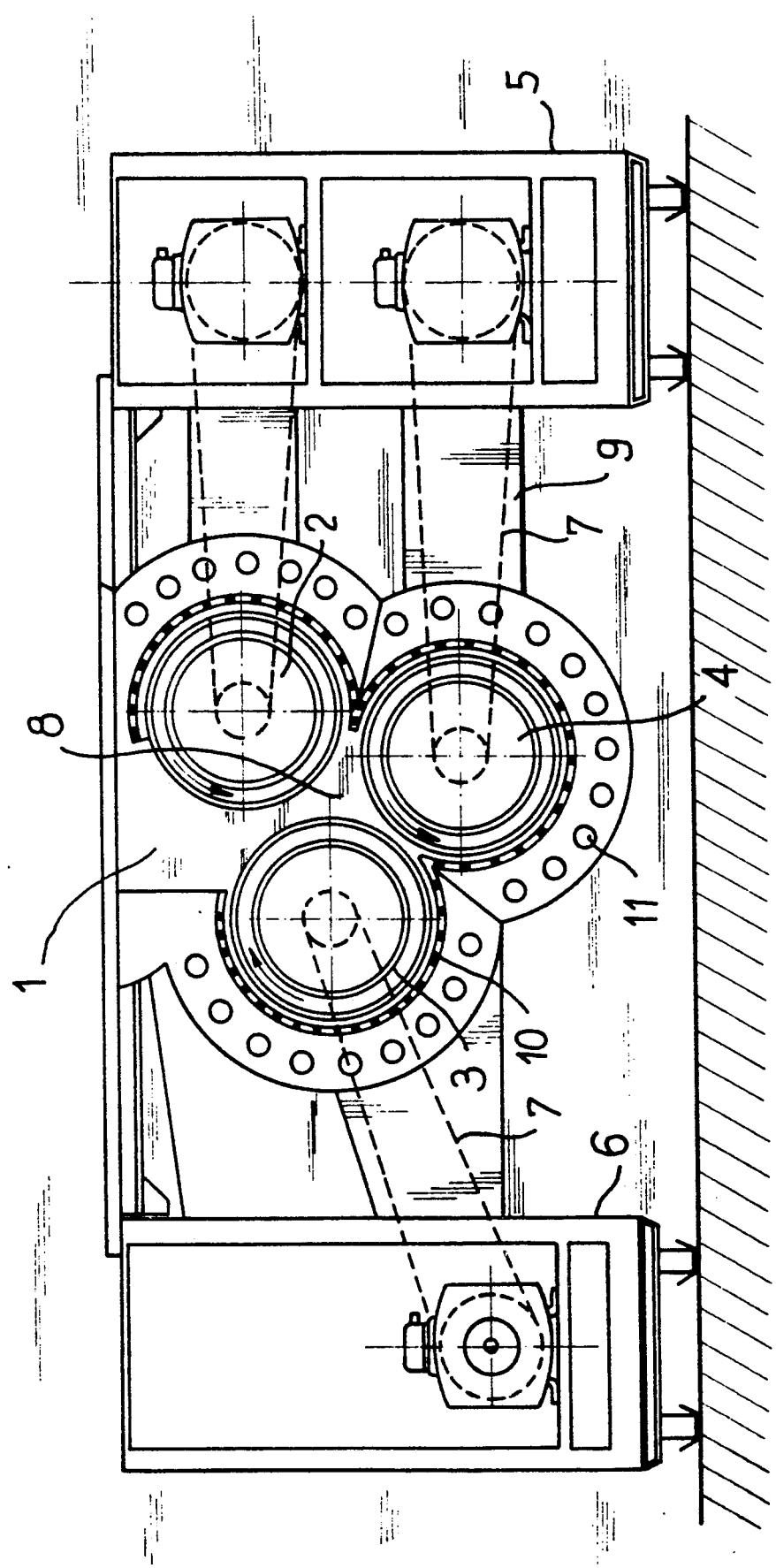
FIG_1

METHOD OF FORMING MINERAL FIBERS

BACKGROUND OF THE INVENTION

1. Field of the Invention

The invention is concerned with techniques for producing rock wool intended, for example, to serve as a basic material for heat and/or sound insulating products. More precisely, the invention is concerned with an improvement in the technique for fibering a drawable material having a high melting point, for example of the basaltic glass, blast furnace slag or other equivalent types of material in which the material to be fibered, while in the molten state, is poured onto the peripheral strip of centrifuging wheels which are caused to rotate, is accelerated by these wheels, becomes detached therefrom and is transformed partly into fibers under the effect of centrifugal force, a stream of gas issuing tangentially to the peripheral strip on the wheels entraining the resultant fibers towards a receiving means and separating them from the non-fibered material.

2. Description of the Related Art

The fiber producing technique outlined briefly above and known for instance from European patent application Nos. 59 152 and 195 725 is exclusively of the free centrifuging type which means both that the molten glass is not divided into a series of elementary streams (internal centrifuging) nor is it subjected to gaseous drawing by a current of air at elevated temperature and velocity. This known fibering technique produces levels of efficiency and fiber quality far inferior to what can be obtained by other techniques which possibly combine centrifugal processing and gaseous drawing. However it is virtually the only one which can be used economically with materials such as basaltic slag which are characterized by far higher melting temperatures than those of conventional sodo-calcic glasses, a quite steep viscosity-temperature curve and an extremely rapid tendency of devitrification which makes it necessary to work in a very narrow range of temperatures.

As centrifugal processing of the molten glass produces an intense cooling of it, it is considered that in this technique of free centrifugal treatment, the fibers are formed exclusively in a field defined by the surface area of the centrifuging wheel and a concentric fringe at a radial distance of about 5 to 10 mm from the periphery of the wheel. As the fibers are drawn out as soon as there is a break in their connection to the strip of molten glass which adheres to the wheel, this break occurs at a distance which varies considerably from one fiber to another, which explains why it is relatively difficult to define this "fringe" precisely.

In this method of fiber production, the fibers are transported out of the immediate vicinity of the fibering machine by a tangential stream of gas emitted at the periphery of the centrifuging wheels in a direction which is substantially at right-angles to the radial direction of fiber emission. According to the art, this stream is constituted by a flow of cold air or smoke cooled to a temperature close to ambient temperature at a mean velocity of for example 100 m/s, this temperature possibly varying to a fairly wide extent from one installation to another. Such a mean speed is in fact far less than the speed of the non-fibered particles which accompany the fibers and which are created by droplets of glass which splash off after having been accelerated by the rotation of the wheels, but without adhering to them, so that there is no drawing action. Acceleration by the centrifuging wheels imparts to these non-fibered particles sufficient speed that the peripheral gas stream has no significant effect on the trajectory of these particles, which leads to a sorting-out from the fibers which are diverted by virtue of their lesser density and lesser velocity.

In other known methods of producing glass fibers or fibers of some equivalent material, the peripheral gas stream is emitted for other purposes: first of all, one may seek to thin the fibers produced by the centrifuge (in this case there is generally an internal centrifugal process). The gas stream is then emitted by a burner at elevated temperature and velocity, the temperature of the gases having to be much greater than the softening point of the glass in order to produce a drawing of the fibers (see U.S. Pat. No. A-2 577 204 or U.S. Pat. No. A-2 949 632 for example). However, such a flame drawing process presupposes that the material to be drawn has a not very steep viscosity-temperature curve which makes it possible to work in a relatively wide range of temperatures, a condition which is not met by materials such as basaltic glasses or blast furnace slags, its previously indicated. Furthermore, a heated gas flame drawing gas flow is by definition more expensive than a stream of cold air. In other cases, a peripheral gas stream is used which is emitted by a continuous jet at a relatively low temperature (heated vapor at approx. 200° C.) which exerts a very powerful and uniform impregnation on the fibers, the effect of which is to improve their mechanical properties (FR-A-1 169 358). It should be noted that this impregnation effect is in no way justified with materials which are already cooled below their softening point by simple centrifuging effect.

Finally, known from FR-A-2 298 518 and FR-A-2 211 408 is a method according to which one seeks to break continuous filaments by means of a peripheral gas stream emitted at right-angles to their direction of formation, the stream being at a sufficiently low temperature that it does not cause any drawing of the filaments, normally a temperature close to ambient temperature and less than 150° C., and preferably less than 65° C.

In all these known approaches, the gas stream emitted at the periphery of the centrifuging means is therefore either very hot (with temperatures which typically exceed 1000° C.) or cold (at a temperature of either around ambient temperature or around 150° C. when vapor was used—as in the case of the oldest installations which do not have a fairly powerful compressor).

SUMMARY OF THE INVENTION

In contrast to these approaches, the present inventors have worked in a heated environment, that is to say with a gas stream the temperature of which is between 250° and 900° C. and preferably between 300° and 600° C., and even more preferably temperature of around 500° C. The invention provides a method of forming mineral fibers in which the material to be fibered is poured in the molten state onto the peripheral surface of the first of a series of centrifuging wheels rotating at high speeds is accelerated essentially there and is delivered to the second wheel where part of the material is converted to fibers under the effect of centrifugal force, the remaining part possibly being returned to the next wheel and so on. The fibers formed by the various centrifuging wheels are entrained in a stream of gas at high velocity surrounding the series of centrifuging wheels and emitted in the immediate vicinity of the wheels in a direction which is substantially parallel with the axes of rotation of the wheels. For at least one of the centrifuging wheels, the stream of gas emitted is at a temperature of between 250° and 900° C. and preferably of between 300° and 600° C.

Quite unexpectedly, it is found that this measure alone produces a highly significant improvement in the quality of the fibers produced by the installation, in particular with a greater degree of fineness and furthermore a lower level of grains (the term "grains" being used to designate particles larger than 100 microns which are found in the end product).

Thus it appears possible to influence the drawing of fibers with a gaseous stream the temperature of which is however far removed from the temperature corresponding to the softening point of the material to be fibered. Indeed, a basaltic glass emerges from the smelting enclosure at a temperature which may for example be greater than 1500° C., and therefore there would not be any question of gaseous drawing with gases at 500° C.

Quite advantageously, this heated environment may be obtained at minimal cost by exploitation of the smoke from the enclosure provided for smelting the material to be fibered, the smoke generally not previously being exploited because it is too "cold" to economically justify any recycling of the heat it contains. All other things being equal, rock wool obtained in a heated environment has a lower level of heat conductivity than that obtained in a cold environment at ambient temperature. The heat resistivity gains thus acquired are for example equivalent to an increase of around 20% in the speed of rotation of the centrifuging wheels or to an increase of more than 50° C. in the temperature at which glass is poured onto the first of the wheels. Whereas the heated environment is not very expensive, these two methods are far less interesting because they result in a higher level of mechanical wear and tear and quite a high energy consumption cost.

The velocity of the gases in the gas stream is preferably greater than 50 m/s and even more preferably greater than 100 m/s which makes it possible to optimize the fiber drawing conditions. The term "drawing conditions" is in this case understood to mean the formation of areas of turbulence which will cause separation of the unitary fibers and limit their tendency to regroup into slivers, and which are encountered as knots in the end product whose mechanical strength they adversely affect.

This effect of the areas of turbulence is probably greater when the procedure according to the invention is adopted with a heated environment, gas physics teaching that the direct effect of this is a higher kinetic energy in the ambient gas flow. To this preliminary hypothesis may likewise be added the hypothesis of a viscous dissipation effect. Studies have shown that the drawing of a fiber gives rise to a substantial release of heat by virtue of the work of viscous structure rearrangement, but this release of heat is normally insufficient in itself to support the temperature conditions needed for drawing, in view of the intense cooling suffered by the fibers by reason of the centrifugal processing. Therefore, there is no reason why one should not think that the heated environment according to the invention might well — by reason of the minimal amount of heat supplied — be sufficient to produce what is a virtually self-supporting phenomenon in terms of drawing conditions. In any case, these are only a few attempts to theoretically determine a phenomenon within a wide and as yet unexplained degree and it is nonetheless true that the heated environment according to the invention does undoubtedly have a favorable effect which from the technical point of view is the only really important point.

For the effect of the heated environment on the fiber forming conditions to be substantial, it is necessary for the stream of gas to be emitted in the immediate vicinity of the centrifuging wheels, preferably flush with them. Furthermore, for a perfectly effective ducting of the fibers, it is preferable for the nozzles of the gas stream to be at a quite substantial distance from the wheels. Bringing these two requirements close to each other presupposes very high rates of flow of air heated to between 250° and 900° C. These flow rates may be greatly reduced if two streams of gas are used, a main gas stream and an auxiliary stream generated at a distance from the centrifuging wheels and having substantially the same direction as the main tangent gas stream. As it happens, the auxiliary gas stream is not heated, which makes it possible to achieve an interesting energy saving insofar as 30 to 50% of the entire flow of gas blown into the apparatus may be blown by means of this auxiliary gas stream.

The fibering process according to the invention may be implemented very easily with any apparatus for fibering mineral wool by free centrifugation. As the temperatures are still relatively low, only a few simple precautions are needed, of the type entailing the cooling of certain parts, it being of course specified that all the precautions normally taken in connection with the high temperature of the molten glass have to be respected.

According to circumstances, particularly if the quantity of hot gas available is limited, it is possible to provide for a stream of hot air for some or all of the centrifuging wheels, particularly those situated at the end of the path of material. It may also be advantageous to preheat rather more the stream of gas which is intended for the final wheels to which relatively colder glass is supplied.

Preferably, an apparatus according to that described in French patent application Ser. No. 90.00420 filed on Jan. 16, 1990 in the name of the Applicants will be used. This apparatus comprises a series of centrifuging wheels disposed in accordance with an assembly which brings their peripheral surfaces close to one another, the wheels being rotated rapidly by laterally disposed motors outside the assembly constituted by the series of centrifuging wheels and driving the wheels by means of mechanical transmission means disposed in such a way as to allow air to pass through the series of centrifuging wheels, two consecutive wheels in the path of the material to be fibered turning in opposite directions. A supply of molten material is raised up so that it can be poured over the outer surface of the first centrifuging wheels a first blowing means generates about the series of centrifuging wheels a stream of heated gas at a temperature comprised between 250° and 900° C., parallel with the axis of rotation of the centrifuging wheels and a second blowing means generates a stream of cold auxiliary gas at a distance from the centrifuging wheels and substantially in the same direction as that of the heated gas stream.

BRIEF DESCRIPTION OF THE DRAWING

A more complete appreciation of the invention and many of the attendant advantages thereof will be readily obtained as the same becomes better understood by reference to the following detailed description when considered in connection with the accompanying drawing, wherein:

FIG. 1 is a front view of a fibering apparatus employing external centrifugation and comprising three centrifuging wheels.

DETAILED DESCRIPTION OF THE PREFERRED EMBODIMENT

FIG. 1 is a front view of a fibering apparatus seen from the fiber side and essentially in accordance with the teachings of the aforesaid French patent application No. 90.00420. This apparatus consists of an assembly 1 comprising three centrifuging wheels 2, 3, 4 disposed in accordance with an assembly which brings their peripheral surfaces close to one another. These wheels 2, 3, 4 are caused to rotate by motor units 5, 6 via transmission belts 7, the two wheels on the right being driven, for example, in a counter-clockwise direction while the wheel on the left is driven in the opposite direction so that two consecutive wheels in the path of the material to be fibered (which descends from the highest wheel 2 to the lowest wheel 4) are turning in opposite directions.

The series of wheels 2, 3, 4 are enclosed by peripheral blowing means 10 constituted by a continuous blower nozzle emitting a stream of heated gases flowing substantially parallel with the axes of rotation of the centrifuging wheels, backed up by an assembly of large diameter nozzles 11 which emit auxiliary jets of cold air substantially parallel with the main gas stream.

Furthermore, means not shown here are provided for spraying a binder composition onto the fibers being formed.

An installation of this type with three wheels of 300 mm diameter was used for various tests differentiated by the temperature of the gases in the main stream. The glass used was a basaltic glass which satisfies the following formulation (percentages by weight):

$SiO_2$ : 44.50%
$Al_2O_3$ : 14.70%
$Fe_2O_3$ : 12.50%
$CaO$ : 10.50%
$MgO$ : 8.90%
$Na_2O$ : 4.25%
$K_2O$ : 0.95%
$TiO_2$ : 2.60%
Others : 1.10%

The viscosity of this glass is $10^2$, $10^{1.7}$ and $10^1$ dPas respectively for temperatures of 1235°, 1300° and 1483° C. Therefore, this is typically a glass of which the viscosity-temperature curve is sharply inclined in the viscosity range appropriate to fiber drawing. Pouring was performed at 1540° C. which corresponds on the first centrifuging wheel to a temperature of 1280° C. monitored by a visual pyrometer, with a glass flow rate of 350 kg/h.

The gas flow rates were 2400 cu.m/h for the main steam (rate of flow calculated at 20° C.) and 1000 cu.m/h for the cold auxiliary stream.

On a basis of such an installation, the temperature of the air of the main stream was varied, choosing a speed of rotation for the centrifuging wheels of 6000 r.p.m. The "fasonaire" was then measured for the various samples of fibers produced in this way, the fasonaire being defined normally as the rate of flow of a current of gas emitted under clearly defined conditions and measured by passing a compressed sample of 5 g of fibers. Without going into more precise detail, the higher its fasonaire, the better quality the sample, that is to say the better its insulating properties.

The following results were obtained:

| Blowing temperature | 25° C. | Fasonaire | 280 |
|---|---|---|---|
| | 250° C. | | 300 |
| | 500° C. | | 325 |
| | 700° C. | | 335 |

The fibers obtained with a stream of heated gases are therefore of a quality which is markedly improved in comparison with fibers obtained at ambient temperature, even if the stream may be regarded as still being at a relatively lukewarm temperature, for example of only 250° C. Furthermore, if one compares the values obtained at 500° and 700° C., a certain levelling out of performance is noted. Therefore, there is an economically optimum temperature at around 500° C., the interest being to work at the lowest temperatures which are sufficiently high to obtain the improvement in the quality of fibers.

The fasonaire gain obtained makes it possible to supply end products which have a volumetric mass reduced by 10% in comparison with a product having the same insulating capacity but which is obtained with a stream of gases at ambient temperature.

The gain is likewise substantial with regard to the total efficiency of the method, the method efficiency being defined as the mass of glass recovered in the end product compared with the total mass poured onto the first centrifuging wheel. A stream of air at 500° C. makes it possible to improve the efficiency by approx. 5 to 10%: a gain which is all the more appreciable since the level of grains — that is to say the percentage of particles in excess of 100 microns present in the produce — has itself a very slight tendency to fall, which denotes an improvement in the quality of the product.

Obviously, numerous modifications and variations of the present invention are possible in light of the above teachings. It is therefore to be understood that within the scope of the appended claims, the invention may be practiced otherwise than as specifically described herein.

What is claimed a new and desired to be secured by Letters Patent of the United States is:

1. A method of forming mineral fibers, comprising the steps of:

pouring the material to be fibered in the molten state, and at a temperature greater than 900° C., onto the peripheral surface of the first of a series of centrifuging wheels which rotate at high speed, whereby the material is substantially accelerated and sent to at least a second wheel from which a part of the material is transformed into fibers under the effect of centrifugal force;

emitting a stream of gases in the immediate vicinity of the said wheels, in a direction substantially parallel with the axes of rotation of the wheels, wherein for at least one of the centrifuging wheels the emitted gas stream is at a temperature between 250° and 900° C.; and entraining the fibers in the gas stream at a position surrounding the wheels.

2. A method of forming mineral fibers according to claim 1, wherein the stream of gases is emitted at a velocity in excess of 50 m/s.

3. A method of forming mineral fibers according to claim 2, wherein the stream of gases is emitted at a velocity in excess of 100 m/s.

4. A method of forming mineral fibers according to claim 1 including the step of emitting an auxiliary stream at ambient temperature at a distance from the centrifuging wheels, the auxiliary gas stream being emitted substantially in the same direction as the main gas stream.

5. A method of forming mineral fibers according to claim 1 wherein the stream of heated gases is emitted solely at the periphery of the last at least one second wheel in the flow direction of the material to be fibered.

6. A method of forming mineral fibers according to claim 1 wherein the temperature at which the gas is emitted increases in the direction of material flow.

7. A method of forming mineral fibers according to claim 1 including the step of heating the stream of heated gases by smoke emanating from the enclosure in which the material to be fibered is melted.

8. A method of forming mineral fibers according to claim 1 wherein said gas stream temperature is between 300 and 600° C.

9. A method of forming mineral fibers according to claim 1 wherein said gas stream temperature is around 500° C.

10. A method forming mineral fibers according to claim 1, wherein said pouring step is performed at a material temperature of at least about 1540° C.

11. A method forming mineral fibers according to claim 9 wherein said pouring step is performed at a material temperature of at least about 1540° C.

* * * * *